United States Patent
Cox

(10) Patent No.: US 9,428,265 B2
(45) Date of Patent: Aug. 30, 2016

(54) INTEGRATED VEHICLE WHEEL MOTOR STRUCTURED TO MANAGE HEAT

(75) Inventor: Isaiah Watas Cox, Baltimore, MD (US)

(73) Assignee: Borealis Technical Limited, Gibraltar (GI)

(*) Notice: Subject to any disclaimer, the term of this patent is extended or adjusted under 35 U.S.C. 154(b) by 284 days.

(21) Appl. No.: 13/114,856

(22) Filed: May 24, 2011

(65) Prior Publication Data

US 2015/0151833 A1   Jun. 4, 2015

Related U.S. Application Data

(60) Provisional application No. 61/396,278, filed on May 24, 2010.

(51) Int. Cl.
*B64C 25/40* (2006.01)
*B60K 7/00* (2006.01)
*H02K 9/22* (2006.01)
*B60K 11/00* (2006.01)

(52) U.S. Cl.
CPC ............ *B64C 25/405* (2013.01); *B60K 7/0007* (2013.01); *B60K 11/00* (2013.01); *H02K 9/22* (2013.01)

(58) Field of Classification Search
CPC ...... B64C 25/405; B64C 25/50; H02K 9/22; B60K 7/0007; B60K 11/00
See application file for complete search history.

(56) References Cited

U.S. PATENT DOCUMENTS

| | | | |
|---|---|---|---|
| 2,430,163 A | 11/1947 | Dever | |
| 3,977,631 A | 8/1976 | Jenny | |
| 6,657,334 B1 | 12/2003 | Edelson | |
| 6,838,791 B2 | 1/2005 | Edelson | |
| 7,116,019 B2 | 10/2006 | Edelson | |
| 7,226,018 B2 | 6/2007 | Sullivan | |
| 7,445,178 B2 | 11/2008 | McCoskey et al. | |
| 7,469,858 B2 | 12/2008 | Edelson | |
| 2002/0089241 A1 | 7/2002 | Du | |
| 2002/0125787 A1* | 9/2002 | Howard | H02K 3/24 310/254.1 |

(Continued)

FOREIGN PATENT DOCUMENTS

GB   2457144 A   8/2009
WO   2008027458 A2   3/2008

*Primary Examiner* — Kip T Kotter

(57) ABSTRACT

A wheel design with heat management capability is provided for an aircraft landing gear wheel that is specifically configured to maximize the space available within a landing gear wheel well to support a geared motor assembly that drives the aircraft wheel when the aircraft is on the ground. A thermal interface between the geared motor assembly and a support wall effectively directs heat generated by brakes, motor, or gear components through the wheel ultimately to be shed entirely outside the aircraft to prevent damage to the wheel and motor components. The heat dissipating wheel and motor driver assembly described herein may be retrofitted in an existing aircraft wheel without changing existing landing gear components, including tires, piston, and axle.

12 Claims, 3 Drawing Sheets

(56) References Cited

U.S. PATENT DOCUMENTS

| | | |
|---|---|---|
| 2003/0006655 A1 | 1/2003 | Zhang |
| 2005/0206250 A1 | 9/2005 | Steffen et al. |
| 2006/0125337 A1 | 6/2006 | Levnat |
| 2006/0158043 A1 | 7/2006 | Brouwer et al. |
| 2006/0273686 A1 | 12/2006 | Edelson et al. |
| 2007/0282491 A1 | 12/2007 | Cox et al. |
| 2009/0114765 A1 | 5/2009 | Cox et al. |
| 2009/0152055 A1 | 6/2009 | Cox |
| 2009/0236158 A1 | 9/2009 | Sakuma et al. |
| 2009/0261197 A1 | 10/2009 | Cox et al. |
| 2010/0065355 A1 | 3/2010 | Reddy |
| 2010/0072837 A1 | 3/2010 | Telakowski |
| 2011/0284685 A1* | 11/2011 | Gilleran ............... B64C 25/405 244/50 |
| 2011/0297786 A1* | 12/2011 | Sweet ................... B64C 25/405 244/103 R |

* cited by examiner

INTEGRATED VEHICLE WHEEL MOTOR STRUCTURED TO MANAGE HEAT

This application claims priority from U.S. Provisional Patent Application No. 61/396,278, filed 24 May 2010, the disclosure of which is fully incorporated herein.

TECHNICAL FIELD

The present invention relates generally to wheel structures adapted to support a motor integrally within the volume of the wheel structure and, specifically, to an integrated vehicle wheel configured to support an electric motor and gearing and structured to manage heat generated by the motor.

BACKGROUND OF THE INVENTION

As airline fuel costs and safety concerns and regulations have increased, use of the aircraft main engines is no longer the best option for achieving, the desired safe and efficient ground movement. Various alternatives to the use of an aircraft's main engines to move an aircraft on the ground have been proposed and tried. The use of a tug or tow vehicle to move an aircraft into and out of a gate or parking location can eliminate the need to use the aircraft main engines. This option, however, is not without its own challenges and costs. More ground vehicles, requiring more fuel and more ground personnel to operate them, add to an already congested environment in the gate area. Restricted use of the aircraft engines on low power during arrival at or departure from a gate is an additional option. This option is also problematic, however. Not only does engine use consume fuel, it is also noisy, and the associated safety hazards of jet blast and engine ingestion in a congested area are significant concerns that cannot be overlooked.

The use of a motor structure integrally mounted with a wheel to rotate the wheel and drive a vehicle, including an aircraft, has also been proposed. The use of such a structure, ideally, should move an aircraft with minimal or no use of an aircraft's main engines. U.S. Pat. No. 2,430,163 to Dever and U.S. Pat. No. 3,977,631 to Jenny, for example, describe drive motors associated with aircraft gear wheels intended to drive an aircraft on the ground. The motor assembly disclosed by Jenny includes a reduction gear assembly positioned to facilitate mounting of a drive motor away from the cramped wheel and brake assembly. In U.S. Pat. No. 7,445,178, McCoskey et al describe a powered nose aircraft wheel system with a multifunctional wheel motor coupled to the wheel axle and the wheel. The motor, which may be driven by a planetary gear assembly or by a direct drive, is located within the hub of the wheel, and the wheels are free to spin on an axle strut by rim bearings. U.S. Pat. No. 7,226,018 to Sullivan also describes a wheel hub motor/generator useful in an aircraft landing gear wheel that includes an arrangement of alternating rotor and stator disks designed to provide motive force to an aircraft wheel when electric power is applied. U.S. Pat. No. 7,469,858 to Edelson, owned in common with the present invention, describes a geared wheel motor design that may be used to move an aircraft from a stationary position for taxiing.

Published United States patent applications, including U.S. Patent Application Publication Nos. US2006/0273686 to Edelson, US2007/0282491 to Cox et al, US2009/0261197 to Cox, International Patent Application Publication No. WO 2008/027458 to Cox et al, and British Patent No. 2457144, also owned in common with the present invention, describe aircraft drive systems that use electric drive motors to power aircraft wheels and move an aircraft on the ground. These disclosures focus on specific, aspects of the drive systems and motor assemblies, including drive system data, motor design, and tire profile.

While the wheel motor designs described above may be effectively employed to drive aircraft wheels and, therefore, move aircraft on the ground, none of them specifically addresses the challenges that can arise from the build up of heat in the wheel motor structures. Heat can build up in the wheel motor, primarily from the application of brakes during landing and taxi, but also from the operation of the motor itself. It is widely recognized that motor output decreases as the motor temperature increases. Shielding an aircraft wheel from heat and managing the heat generated by the aircraft brakes and other sources is critical to continued effective functioning of the aircraft wheel. Brake heat can be specifically problematic, moreover, because heat from this source builds up very rapidly and can subject any adjacent wheel or other structures to thermal spikes that can unacceptably weaken these structures. Aircraft wheels are typically made of a forged aluminum alloy that cannot tolerate high temperatures without the subsequent tempering and/or weakening of the wheel material. The known technique of providing a thermal shield to protect an aircraft wheel from the motor-generated and other heat to prevent harm to the wheel may be effective, but this can add undesirable structure and weight to a landing gear assembly.

U.S. Patent Application Publication No. 2009/0152055 to Cox describes means for cooling the brakes in aircraft undercarriage wheels by disengaging and spinning the motor used to provide traction on landing. The spinning of the motor and also the rotor component of the motor produces cooling as air is carried from a cooler location, preferably through holes or tunnels, to the location of the brakes. While this arrangement may effectively provide the requisite cooling during braking, it does not address longer term heat management considerations.

Arrangements for cooling wheel motors have been proposed in the prior art. Sakuma et al, in U.S. Patent Application Publication No. US2009/0236158, disclose a cooling apparatus for an in-wheel electric motor for a vehicle that includes a knuckle structure holding the wheel that functions as a radiator. A supply of a refrigerant, identified as oil, a refrigerant pump, and supply lines are required for operation of the apparatus. This design, while effective for cooling road vehicles, would add additional unacceptable weight and size to an aircraft drive wheel. In U.S. Patent Application Publication No. US2010/0065355, Reddy describes a cooling system for an electric drive motor that uses temperature sensors and electronic controllers to generate and regulate air flow driven by an electric fan and is designed to cool, in conjunction with an internal combustion engine, the wheel motors in large, heavy off-highway vehicles. Not only would this design add additional unacceptable weight if used in an aircraft, but Reddy does not suggest that it could function without the engine. U.S. Patent Application Publication No. US2010/0072837 to Telakowski describes a motor cooling system useful for aircraft moving at low speeds that is intended to maintain the motor at desired operating temperatures during various travel states. Cooling fluid is received from ram air and a secondary source, such as an aircraft compartment, in response to the aircraft operating state. There is no suggestion, however, that this system could be used in drive wheel motors or motors other than the fan and compressor motors described therein.

The prior art, therefore, does not suggest apparatus or method designed to effectively manage heat in an in-wheel motor suitable for use in an aircraft ef or other vehicle drive wheel that does not add unacceptable bulk or additional components to the wheel structures or wheel well or that effectively uses a wheel structure to direct heat flow away from the aircraft. None of the foregoing patents or publications, moreover, suggests heat management in an aircraft wheel that is specifically configured to maximize the limited landing gear space available by integrating within the wheel a compact motor and gear assembly capable of powering an aircraft drive wheel. This art, moreover, does not contemplate a wheel structure shaped for optimum heat management to support an integral configuration of wheel, heat management structure, motor, and gear components that can be retrofitted in existing aircraft or that provides easy access to these components for maintenance and repair when the motor is not in operation.

A need exists, therefore, for effective heat management in an in-wheel motor suitable for use in an aircraft drive wheel or other vehicle wheel used to move the aircraft or other vehicle that employs the wheel in a heat conduction pathway that allows heat to be shed entirely away from the aircraft. A need also exists for heat management in an aircraft wheel that is specifically configured to maximize, the limited landing gear space available by integrating within the wheel a compact motor and gear assembly capable of powering an aircraft drive wheel that can be installed in an existing aircraft without modification of landing gear structures.

SUMMARY OF THE INVENTION

It is a primary object of the present invention, therefore, to provide effective heat management in an in-wheel motor suitable for use in a vehicle drive wheel used to move the vehicle on the ground including a heat conduction pathway that ultimately directs heat into the ambient environment substantially entirely away from the vehicle.

It is another object of the present invention to provide heat management in an aircraft wheel configured to maximize the limited landing gear space available to integrate within the wheel a compact motor and gear assembly capable of powering an aircraft drive wheel that uses the wheel in a heat conduction pathway to direct heat to adjacent landing gear structures or into the ambient environment outside the aircraft wheel.

It is a further object of the present invention to provide heat management in conjunction with a wheel structure specifically configured to maximize the space available to support an electric motor and gear assembly and designed to fit integrally within an aircraft wheel without changes to the aircraft landing gear components.

It is an additional object of the present invention to provide a wheel structure shaped to support an electric motor and gearing integrated with an aircraft gear wheel that provides a solid thermal connection between the motor components and the wheel axle and landing gear piston to facilitate heat dissipation away from the motor and wheel assembly.

It is yet another object of the present invention to provide apparatus and method for managing heat in an aircraft drive wheel that maximizes heat shedding from the drive wheel motor into the wheel and directs the heat from the wheel to adjacent landing gear structures and/or into air around the drive wheel.

It is yet a further object of the present invention to provide a method of managing heat flow in an aircraft landing gear drive wheel equipped with a motor and gear assembly that provides a heat conduction pathway through the wheel to the ambient air outside the drive wheel and landing gear.

In accordance with the aforesaid objects, heat management is provided for a wheel structure configured to support an electric motor and gear assembly integrally incorporated into an aircraft landing gear drive wheel that prevents a potentially damaging accumulation of heat as the wheel is driven on the ground independently of the aircraft main engines. Heat management in this wheel configuration includes a strong thermal connection between a wheel configured to maximize the apace available in the aircraft landing gear wheel well and the compact motor and gear assembly components specifically designed to fit within the wheel space. A thermally conductive interface between the motor and a wheel stator is provided to direct heat away from the motor and through the wheel to adjacent landing gear structures and/or into the ambient air to maintain wheel temperatures within a range that prevents damage to the wheel material. This wheel configuration is designed to be installed to provide effective heat management in existing aircraft without replacement of existing landing gear components. A method of managing heat in an aircraft landing gear drive wheel that provides a heat conduction path that ultimately sheds heat entirely away from the aircraft is also provided.

Other objects and advantages will be apparent from the following description, drawings, and claims.

DETAILED DESCRIPTION OF THE INVENTION

Figure 1:
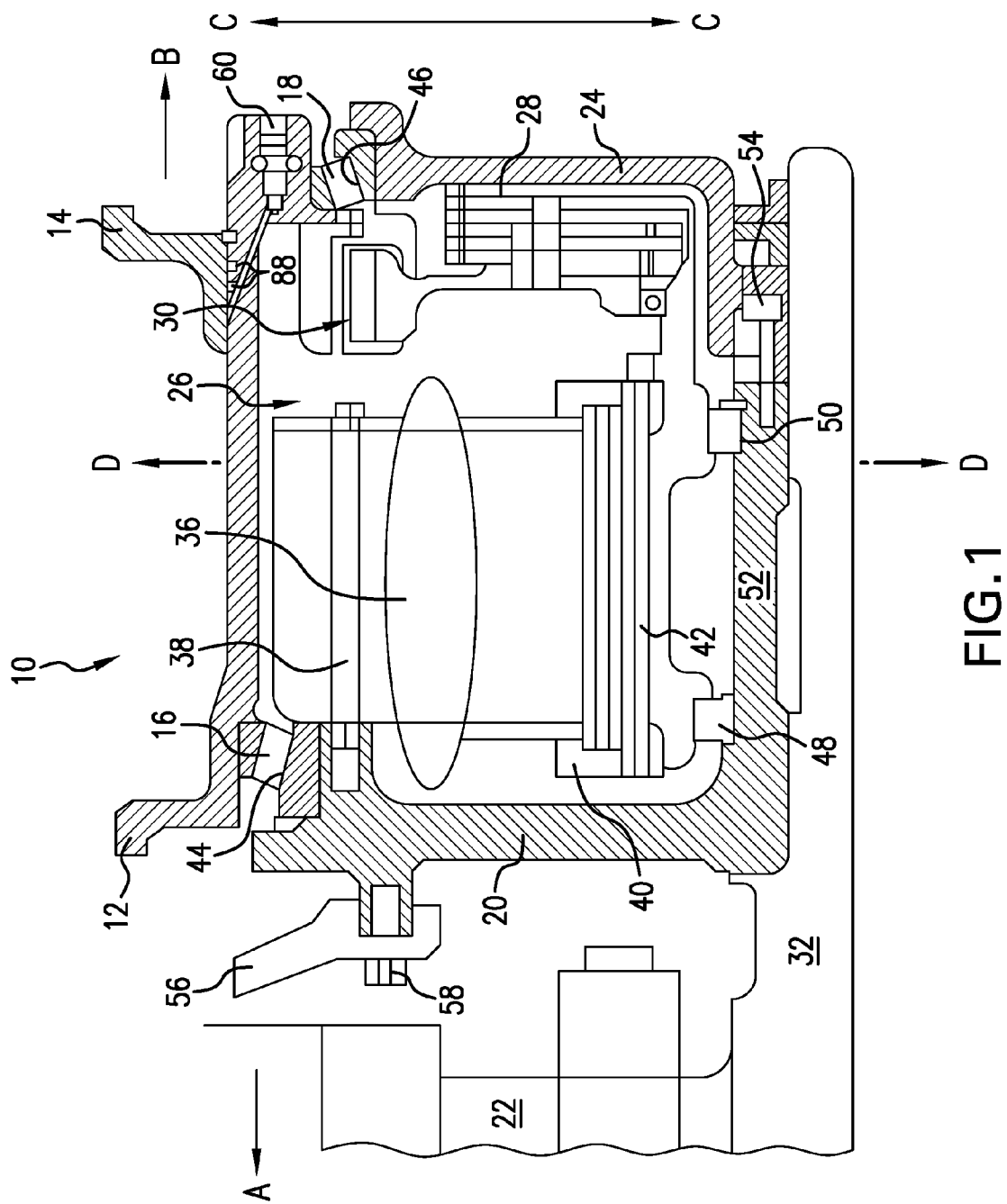
FIG. 1 is a diagrammatic illustration of a wheel in which heat is managed in accordance with the present invention in a motor assembly and gear system integrated substantially completely within an aircraft landing gear wheel well.

The many advantages of being able to drive an aircraft on the ground independently without using the aircraft main engines have been acknowledged, as have the challenges associated with dissipating the build up of heat in the landing gear wheels generated by the operation of an aircraft's brakes. When an aircraft landing gear wheel has a drive motor, additional heat is generated by the operation of the motor and is also likely to be produced by the gearing for the motor. Whatever the source, an excessive accumulation of heat can damage an aircraft wheel assembly. Although the intermittent thermal spikes produced when an aircraft's brakes are applied can be quite damaging, the lower grade heating produced by wheel motors is likely to occur over a longer time period during all stages of ground taxi. Consequently, heat from a drive wheel motor poses a longer term consideration for potential wheel damage and, optimally, structure should be provided to effectively dissipate or shed this heat from the wheel into adjacent structures and/or the air around the wheel to prevent its accumulation and the subsequent wheel damage.

Managing heat within a motor and gear assembly integrated within an aircraft gear wheel as the aircraft is being constructed does not present problems because the space available for landing gear components, including motors for driving gear wheels or heat management structure, can be adjusted as required. Retrofitting existing aircraft presents challenges, however. Heat management in accordance with the present invention is designed to be part of an integral wheel and geared motor assembly installed within a unique wheel configuration that overcomes these challenges. A wheel and geared motor assembly that avoids damaging heat build up and can be fitted into the limited space available for aircraft landing gear components without modifying any of the other landing gear components is provided by the present invention. Consequently, an aircraft's existing wheel well, tire, axle, piston, and other landing gear components can be used with this integrated wheel and geared motor assembly. Existing aircraft can be retrofitted simply and effectively so that these older aircraft will be able to minimize wheel damage from heat accumulation and can achieve the fuel and cost savings and other advantages of aircraft ground movement that is independent of the aircraft engines and external ground vehicles.

Since landing gears on existing aircraft are already completely designed to function without additional components like electric drive motors and gear assemblies, there is minimal, if any, space available for heat dissipating structure in addition to a motor, a gear assembly, a clutch, if required, electrical connections, and other components. Modifications to accommodate such structures usually require changes to the landing gear axle or piston. Such modifications can be expensive and time consuming, in large part because any changes from existing structures require re-certification by regulatory authorities such as the United States Federal Aviation Administration (FAA) and equivalent international regulatory authorities. As a result, providing an integrated vehicle wheel motor structured to manage heat for installation in an existing aircraft landing gear wheel that does not require re-certification would be highly desirable.

Referring to the drawings, FIG. 1 illustrates diagrammatically a wheel and geared motor assembly with heat managing capability according to the present invention. The overall configuration of the present wheel and integrated geared motor assembly differs structurally and functionally from available aircraft gear wheel designs. In FIG. 1, the arrows A and B indicate, respectively, the inboard and outboard orientation of the assembly with respect to an aircraft landing gear. Line C-C represents the aircraft wheel well opening and, thus, the outboard boundary of the available space for the wheel and its associated structures.

FIG. 1 clearly shows that the wheel 10 of this wheel and geared motor assembly has a configuration that is different from a common standard wheel shape, which typically bends inwardly toward the inboard direction from the outer rim. The wheel configuration of the present invention bulges instead in the opposite direction, toward the outboard direction B. This configuration maximizes the internal wheel volume and provides maximum space for integrating heat managing structure with a gear and motor assembly to fit substantially completely within the wheel space provided.

The main part of wheel 10 supports and rotates with a tire (not shown) on tire flanges 12 and 14 and is connected to the motor assembly components through bearings 16 and 18, as will be explained below. A support wall or side plate 20 is the inboard, or inside, support wall for the wheel 10. Unlike in a conventional wheel, the support wall 20 does not rotate and, therefore, functions as a wheel stator. The shape and location of wall 20 are selected so that this structure is located as close as possible to the landing gear piston 22. Although not shown, a pass-through for wiring, preferably in the form of a wiring harness, is provided in wall 20. This wiring optimally provides a single connector through the wheel configured to serve all of the electric functions and wiring for the wheel and geared motor assembly. An outboard, or outside, support wall or side plate 24 is located opposite the inboard support wall 20. The space available for heat management, motor, gearing, and associated structures can be maximized by locating the outboard support wall 24 as far away from the midpoint of the wheel assembly, represented by line D-D, as possible within the boundary of the wheel well, represented by line C-C. Alternatively, a motor or gearing component described below could be used in place of either or both of the inboard or outboard support walls 20 and 24.

Figure 2A:
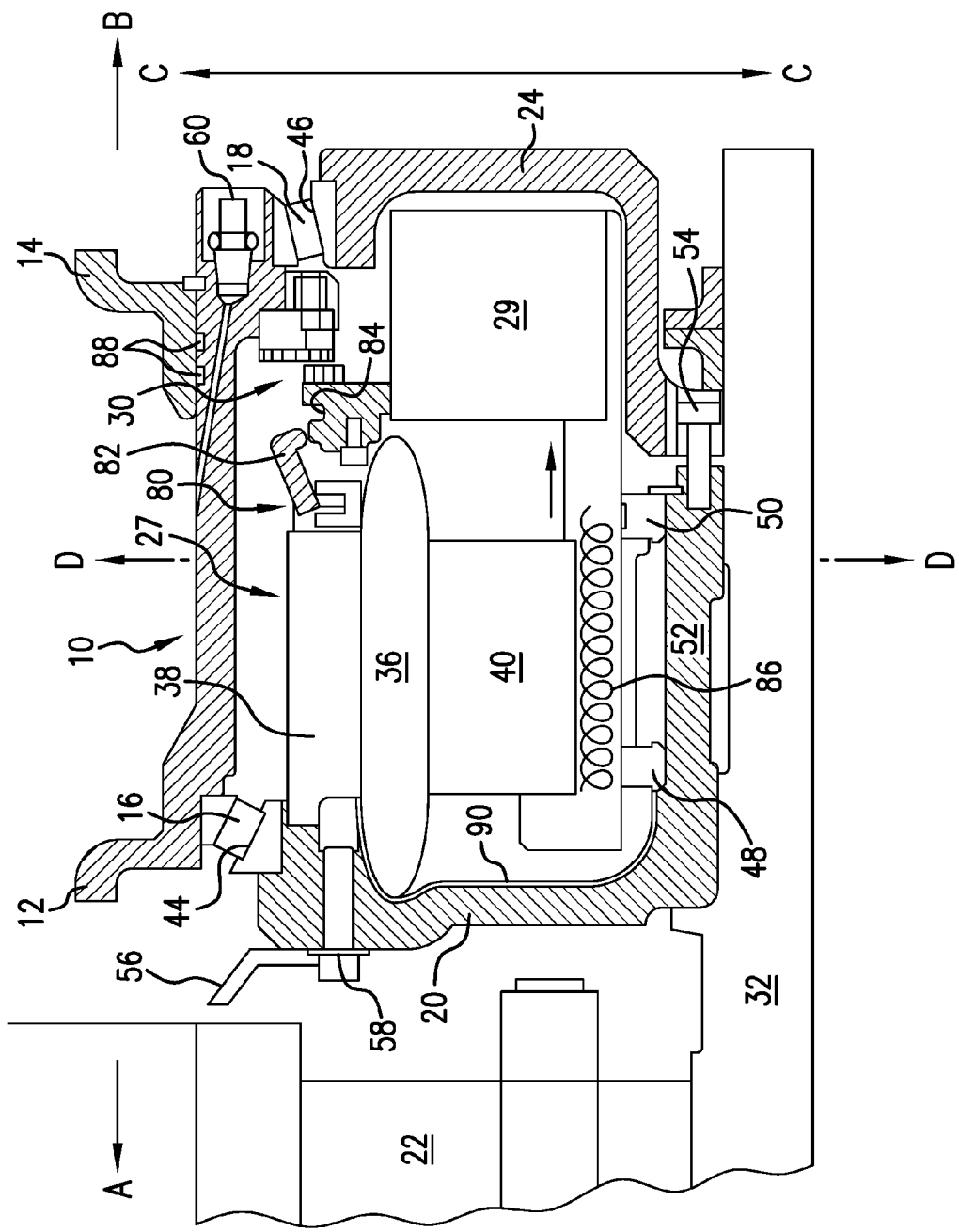
FIG. 2a is a diagrammatic illustration of another embodiment of heat management in a motor assembly and gear system integrated within an aircraft wheel according to the present invention showing the motor assembly in an unengaged condition.
Figure 2B:
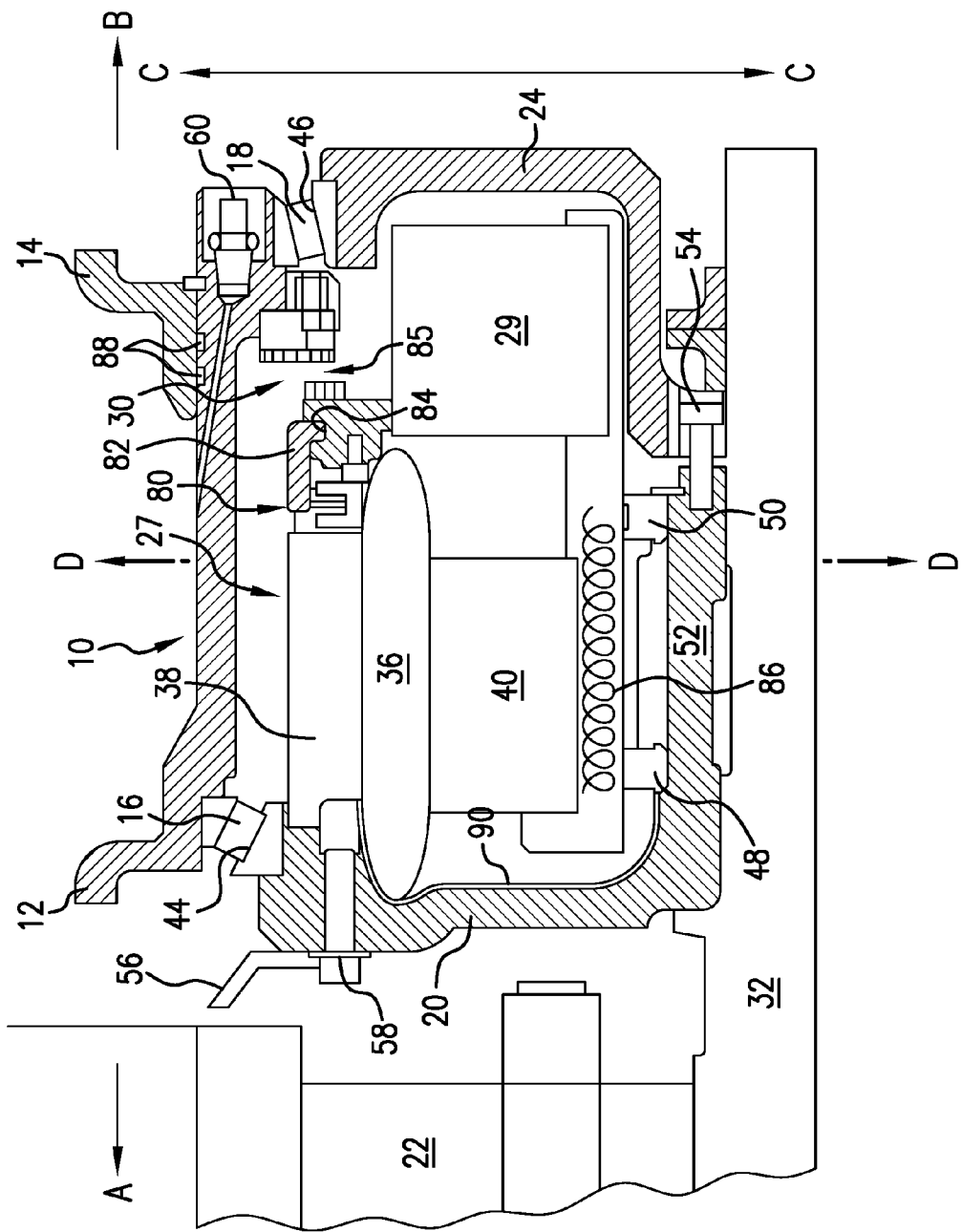
FIG. 2b is a diagrammatic illustration of another embodiment of heat management in a motor assembly and gear system integrated within an aircraft wheel according to the present invention showing the motor assembly in an engaged default condition.

As shown in FIGS. 1, 2a, and 2b, a motor assembly 26 is enclosed completely within the wheel boundaries formed by the respective inboard and outboard support walls 20 and 24. While the motor assembly support walls 20 and 24 are preferably formed of steel, other materials that are suitable for use in this environment could also be used for this purpose.

In the embodiments shown in FIGS. 1 and 2a and 2b, the motor assembly 26, 27 includes a stator 36, preferably mounted by a precision fitted flanged tube 38 to ensure the alignment of the stator stack. Multiple bolts, screws, or other suitable fasteners (not shown) are preferably provided to hold the stator to the wheel inboard support wall 20. One preferred arrangement uses about six to eight high strength, high torque bolts to connect the stator 36 to the inboard support wall 20. A rotor 40 is shown mounted on a splined shaft 42, although other mounting structure could be used. Bolts (not shown) are preferably provided to squeeze the rotor stack together. While this arrangement of rotor and stator components is preferred, other rotor and stator designs that are configured to fit within the wheel well volume are also contemplated to be within the scope of the present invention.

As part of the heat management capability of the present invention, it is preferred that the motor assembly be a totally enclosed machine capable of operating for about 5 to 10 minutes at maximum torque and for 30 to 40 minutes at cruise torque, relying primarily on the motor itself as the heat sink. Relying primarily on the motor assembly as the heat sink keeps the motor environment cleaner than other arrangements. An electric motor preferred for use as an effective heat sink with the wheel and motor driver assembly of the present invention could be any one of a number of designs, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, or any other electric motor geometry known in the art is also contemplated to be suitable for use as a heat sink in accordance with the present invention.

The electric motor selected should also be able to move an aircraft gear wheel at a desired speed and torque. One kind of electric drive motor preferred for this purpose is a high phase order electric motor of the kind described in, for example, U.S. Pat. Nos. 6,657,334; 6,838,791; 7,116,019;

and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric motor capable of driving a gear wheel to move an aircraft or other vehicle on the ground, including but not limited to electric induction motors, permanent magnet brushless DC motors, and switched reluctance motors may also be used. Other motor designs capable of high torque operation across the desired speed range that can be integrated into an aircraft wheel to function as described herein may also be suitable for use in the present invention. A particularly preferred motor is a high phase order induction motor with a top tangential speed of about 15,000 linear feet per minute and a maximum rotor speed of about 7200 rpm. With an effective wheel diameter of about 27 inches and an appropriate gear ratio, an optimum speed of about 28 miles per hour (mph) can be achieved.

It is preferred that an air gap (not shown) of about 1 mm is maintained in the motor assembly by insuring that indexing surfaces of the rotor 40 and stator 36 are precisely formed. Because the wheel stator 20 in the present motor assembly preferably does not rotate, even if the stator 36 and rotor 40 touch during shock loads, damage to the motor assembly should be avoided.

The motor assembly 26 is drivingly connected to a gear system 28. While the preferred gear system 28 is a system of planetary gears as shown in FIG. 1, any other type of gear system that can function for the desired purpose could also be employed. One preferred arrangement employs at least four high strength steel planetary gears at each stage to achieve a gear ratio of approximately 20:1. Other appropriate gear ratios could also be used and are contemplated to be within the scope of the present invention. Integrating a gear system, such as gear system 28, with the motor assembly 26 permits the motor assembly to run more effectively at higher revolutions per minute (rpm). Any known gearing arrangement that will achieve these results in this environment is contemplated for use herein.

The motor driver assembly 26 is preferably not attached to the wheel 10 at all times during operation. To achieve this, a clutch 30 is preferably provided to selectively engage and disengage the gears 28 and, thus, the motor assembly 26 from the wheel as required. Employing a clutch to disconnect the drive motor from the wheel at touchdown would minimize spin-up load. A motor that does not require a clutch could also be installed within the wheel as shown and is contemplated to be within the scope of the present invention.

FIGS. 2a and 2b show another embodiment of a motor assembly and gear system integrated within a drive wheel to manage heat in accordance with the present invention. The same reference numbers are used in FIG. 1 and in FIGS. 2a and 2b to designate identical structures. In the embodiment shown in FIGS. 2a and 2b, the clutch 30 is driven by a solenoid 80 that locks the gear assembly 29 to the wheel 10 through the stator 36. The motor assembly 27 is not attached to the wheel at all times in this embodiment. A latch 82, powered by the solenoid 80, keeps the gears from engaging unless the latch 82 has been explicitly lifted by a control system (not shown) out of engagement with a correspondingly configured groove 84 located in the clutch assembly 30. A spring 86 provides sufficient force to ensure that the default condition is maintained and the latch 82 is engaged in the groove 84 so that the gear assembly 28 is disengaged from the rotating portion of the wheel 10 to produce a gap 85 as shown in FIG. 2b. FIG. 2a shows the latch 82 disengaged and the clutch assembly 30 engaged.

Unlike in the FIG. 1 embodiment, the motor assembly 27 does not serve as the primary heat sink for the FIG. 2 embodiment. The motor assembly 27 is designed and positioned to form an interface 90 with a configuration that is substantially identically to the configuration of the wheel stator or inboard support wall 20 and conforms precisely to that of the inboard wall 20. The interface 90 may be formed of any of a number of thermally conductive materials known in the art as ideal for maximizing heat transfer between two different materials under a range of different conditions. Interface 90 may be formed integrally by the contact of the adjacent mating surfaces of the motor assembly 27 and the inboard wall 20. A selected thermally conductive material could be applied as a coating to one or both of the mating surfaces of the motor assembly 27 and the wheel stator 20 to enhance thermal conductivity at the interface 90. Interface 90 could also be a separate interface element interposed between the motor assembly 27 and the wheel stator 20. A separate interface element should be formed of a suitable thermally conductive material that would not add weight or bulk to the motor assembly 27 and wheel stator 20.

A plurality of bolts or other suitable connectors, such as bolt 58, are provided to compress the interface 90 between the motor assembly 27 and the wheel stator or inboard support wall 20 to ensure that sufficient force can be applied to these structures to produce an optimum thermal bond. Preferably, the connectors should apply a force to interface 90 in the range of about 30 psi to about 200 psi. In some situations, a force in excess of 200 psi may be required to form a thermal bond that optimally maximizes heat transfer.

In operation, the motor assembly 27 produces heat, which flows through the interface 90 to the wheel stator or inboard support wall 20. From the wheel stator or inboard support wall 20, heat can then flow either to the ambient air in the environment outside the landing gear wheel components and/or to adjacent landing gear structures, such as the wheel axle 32 and the piston 22. The wheel functions in some respects as a radiator as well as a conductor of the heat to be dissipated to the air and to these large landing gear structures. This highly conductive pathway allows heat ultimately to be shed entirely away from the aircraft.

The removal of heat generated during operation of the motor assembly 27 as described above should extend significantly the useful life of the motor assembly 27, gear assembly 28, and their associated components. The wheel stator or inboard support wall 20 is typically made from an aluminum alloy, which is an excellent heat conductor and will keep the motor assembly 27, which is typically formed from stainless steel or the like, cooler than it would otherwise be. The conduction of heat away from the motor assembly 27 through the interface 90 and then through the wheel stator or inboard support wall 20 into the air and/or to the axle 32 or piston 22 also extends the operating life of the wheel by ensuring that the wheel structures are kept below the maximum safe temperatures for preventing damage to the wheel material. The maximum safe temperatures to be maintained to prevent wheel damage are in the range of about 300° F. to about 400° F. The solid thermal connection provided by this arrangement between the motor assembly 27 and the hardware of the axle 32 and piston 22 effectively uses these large metallic components to conduct potentially damaging heat away from the motor assembly and the wheel and into the ambient environment surrounding the landing gear.

Heat generation can be reduced by the installation of a wheel speed sensor (not shown) in the solenoid. A wheel speed sensor could be installed anywhere facing a moving wheel component within the wheel and motor assembly. Such sensors are known in the art and could be selected from any commercially available (COTS) solution. The wheel speed sensor will allow the motor assembly 27 to engage after the motor speed is synchronized with the wheel speed. This permits considerable clutch and solenoid operation flexibility and can reduce heat generation as well as component interface wear to negligible levels.

In an additional variation of a geared motor assembly with heat management capability that is not shown, rotor 40 could have a conical shape, which would cause the air gap to be about 1 mm when the rotor 40 is engaged and about 0.25 inch when it is not engaged. A solenoid might not be needed with this design.

The wheel 10 and motor assembly 27 preferably rest on and are supported by the landing gear wheel axle 32, as shown. Other arrangements whereby a motor assembly may be supported within a gear wheel relative to an axle may also be employed. Ideally, the axle 32 and piston 22 are not altered from their original condition when the heat management and geared motor components are installed on an existing aircraft, which facilitates development and certification.

Maximum space is provided for the structures of the FIGS. 2a and 2b motor assembly 27 and gear system 29 by locating the inboard and outboard wheel support walls 20 and 24 as far away from the midpoint, represented by the line D-D, of the wheel 10 and axle 32 as possible. The outboard support wall 24 must be positioned to avoid coming into contact with the narrowest part of the wheel well or landing gear doors, which is represented by the vertical boundary line C-C. The outboard support wall 24 may be located a selected distance inboard of the wheel well boundary line C-C, as shown, or further outboard, if required.

The inboard wheel support wall 20 and the outboard wheel support wall 24 are provided with notches 44 and 46, respectively, shaped to receive bearings 16 and 18. These large bearings allow removal of the wheel 10 without removing any other hardware, thereby facilitating inspection of these bearings. The use of large bearings permits more travel and more evenly distributed loads, which enhances bearing life. This motor assembly and gear system are not intended to be structural elements or part of a shock chain. The bearing structures described are preferably designed to handle about three times the shock load of the current bearings.

The wheel support walls 20 and 24 are coupled together through the notches 44 and 46 to ensure sufficient axial play that the bearings 16 and 18 can be preloaded. Additional bearings 48 and 50 near the axle 32 support the motor assembly 26 on an axle-contacting extension 52 of the inboard support wall 20 that may be keyed to the outboard support wall 24. Bolts or suitable fasteners, such as bolt 54, are provided to hold the support walls together so the entire wheel and motor assembly can be removed as a unit. The bearings 48 and 50 will require occasional removal for lubrication. These bearings could also be preloaded through an axle nut (not shown) or by way of bolt 54 or other bolts (not shown) that may be employed to connect the inboard and outboard support walls. Alternatively, the inboard and outboard support walls 20 and 24 could be machined as a single, integral structure. One or both of the inboard or outboard support walls could be completely or partially replaced by one or more of the motor driver components. For example, the stator 36 could replace support wall 20, and/or the gear system 28 could replace support wall 24.

A torque arm 56 configured to be connected at one end by the bolt 58 or another fastener to the inboard support wall 20 provides a mechanical connection between the motor components and a non-rotating landing gear structure to provide for a torque reaction. Examples of non-rotating landing gear components that could be connected to the opposite end of the torque arm 56 are tow fitting ears or a tow jack (not shown). All torque goes out from the arm 56. As a stator support is grounded back to the torque arm 56, the bolts (not shown) connecting the stator 36 to the inboard support wall could also be used as a torque device.

A valve stem 60 is positioned above bearing 18 and the outboard support wall 24 to allow easy access to the wheel tire and valve (not shown) to check tire pressure and inflate the tire, if necessary. The valve stem can be accessed from the outboard side of the wheel without interfering with the motor drive assembly. Moreover, the arrangement of the motor driver assembly 27 within the wheel 10 makes changing a tire mounted on the wheel a significantly easier process than changing a tire on existing aircraft wheels. The motor assembly and gear system do not have to be removed from the aircraft and can stay in place within the wheel as shown in FIGS. 1, 2a, and 2b. As a result, the amount of wheel mass that must be removed from the aircraft during a tire change is reduced considerably, since the bulk of the inboard support wall supports motor mass that can stay connected to the aircraft. In addition, the use of a low profile tire, such as that disclosed in International Patent Application No. WO 2008/027458, the disclosure of which is incorporated herein by reference, can also help maximize the space available inside the wheel well.

In contrast to tire flange 12, tire flange 14 is designed to be a demountable flange to provide more space for the motor assembly 26. Suitable air seals, such as O-ring grooves 88 or the like are preferably provided adjacent to the demountable flange 14 for an air seal (not shown). This arrangement further facilitates tire changes.

Not only are tire changes easier with the wheel and motor driver assembly described herein, but servicing the motor driver assembly can be performed without disconnecting electric connections between the motor assembly 27 and a wire harness (not shown) that leads into the aircraft fuselage. Moreover, the wheel and motor driver assembly shown in FIGS. 1, 2a, and 2b is configured to permit easy access to motor components, such as the stator 36, rotor 40, or bearings 16 and 18, after simply removing the wheel 10. Preferably, the bolts closest to the axle 32, such as bolt 54, and the outboard support wall 24 are removed, which allows the wheel to be moved away from the motor assembly 27. The entire wheel and geared motor assembly can be easily removed, if needed, for remote servicing by disconnecting the assembly from an axle using the axle nut and spacer (not shown). The axle nut and spacer used in the present design are the same as the axle nut and spacer components currently used in existing aircraft and do not have to be changed. Additionally, the motor driver assembly 27 is effectively sealed from contaminants, such as water, ice, and snow, and highly corrosive materials, such as the deicing chemicals and hydraulic fluids commonly used at airports.

A major advantage of the design of the wheel 10 and motor driver assembly 27 is achieved by the continued use of the existing tires, axle 32, and piston 22 already in use on an aircraft. Since these structures are not altered from their original condition or otherwise changed in any way by the installation of the present wheel and motor driver assembly, the rim width, tire bead, and bead seat would not require re-certification by the FAA or other authorities, thus eliminating a potentially time consuming and costly process. As a result, the wheel and motor driver assembly with heat management capability as described herein is especially well suited for installation on existing aircraft.

Another advantage of using the wheel and motor assembly design of the present invention in an aircraft landing gear assembly is the ability to minimize spin-up loads for the wheel by removing considerable motor mass as compared to existing landing gear designs that include motors. The motor is able to spin-up and match the wheel speed before the clutch is engaged. This allows the electric drive to connect or disconnect as required without bringing the aircraft to a halt before engaging or disengaging the motor assembly 27 and gear system 29 by controlling engagement and disengagement of the latch 82.

The geared motor assembly of the present invention is integrated with an aircraft gear wheel to manage heat as the aircraft is driven on the ground, preferably completely without the use of the aircraft main engines. A preferred source of power for the present geared motor assembly is the aircraft auxiliary power unit (APU). The present geared motor assembly is capable of operating on about 45 kVA per wheel, and the wiring harness (not shown) described above in connection with the inboard support wall 20 should be able to handle this amount of electrical power, although during normal operation the amount of power used per wheel is likely to be closer to 15 kVA.

A cockpit interface (not shown) is preferably electrically and drivingly connected between the aircraft APU and the geared motor assembly to activate and control the motor assembly to drive the aircraft on the ground from the cockpit. The preferred cockpit interface includes a switch with at least two levels of "ON" settings. A first "ON" setting turns on an associated computer system, fans, and the like, and powers the wheel speed sensor (not shown) to determine whether full activation of the geared wheel motor assembly is safe. Additional cockpit controls for manually engaging and disengaging the solenoid-mounted latch 82 may also be provided.

The motor assembly and gear system are designed so that the motor assembly 27 and gear system 29 are not connected and automatically disconnect whenever the motor assembly 27 is not receiving electrical power. This prevents the engagement of the motor assembly 27 in flight or before the aircraft is active on the runway. The present motor assembly and gear system are not intended to be connected or operational when the aircraft is in flight. If the motor assembly and gear system, for whatever reason, did not disconnect and were connected during flight, this would be detected, preferably through a cockpit interface, before the aircraft was active on the runway. The solenoid 80 provides an active way to "goose" the motor assembly 27 and gear system 29 connection and to disconnect them through the latch 82 and the clutch 30, should these components fail to disconnect when required. The motor assembly 27 and gear system 29 are designed to prevent engagement of the motor assembly 27 and gear system 29 at wheel speeds higher than about 28 to 30 mph, which keeps tangential motor speeds at safe levels.

None of the foregoing advantages or any of the other-advantages presented by the present, geared wheel assembly with heat management capability are demonstrated by prior art aircraft landing gear wheel and motor designs. This wheel and integrated geared motor assembly has been described in connection with a single aircraft gear wheel. This assembly can also be used simultaneously on more than one aircraft wheel, including one or more of the nose wheels or the other aircraft wheels. Additionally, the heat management capability of this assembly could be employed with any type of vehicle drive wheel to prevent wheel damage caused by heat accumulation.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability in retrofitting existing aircraft to provide effective heat management capability and to integrate effective and efficient wheel and geared motor assemblies substantially completely within an aircraft wheel well without modifying existing landing gear components when it is desired to provide the advantages and benefits that can be achieved by powering aircraft gear wheels to drive an aircraft on the ground.

The invention claimed is:

1. A system for managing heat in an aircraft landing gear drive wheel driven by an electric drive motor to produce optimal heat dissipation and prevent heat accumulation, comprising:
   a. an aircraft nose or other landing gear wheel assembly rotatably mounted on an axle, comprising at least an inboard wheel support wall and an outboard wheel support wall, wherein said inboard wheel support wall is positioned inwardly of a center of said wheel assembly adjacent to a landing gear piston and said outboard wheel support wall is positioned outwardly of the center of said wheel assembly adjacent to an outboard boundary of a landing gear wheel well to define an internal wheel space; and
   b. a compact drive motor assembly mounted completely within the defined internal wheel space, comprising at least an electric drive motor, a gear assembly, and a clutch assembly positioned to provide a selectively engaged or disengaged connection between said gear assembly and said electric drive motor, wherein said drive motor assembly is integrated with said wheel assembly to provide a solid thermal connection between components of said drive motor assembly, said axle, and said piston adapted to direct heat away from said drive motor assembly through said wheel assembly to said axle and said piston or into ambient air.

2. The system described in claim 1, wherein said drive motor assembly comprises a wheel-contacting surface and said wheel assembly comprises a drive motor assembly-contacting surface, wherein said wheel assembly-contacting surface and said drive motor assembly-contacting surface are positioned to form a conforming heat conducting mating interface therebetween.

3. The system described in claim 2, further comprising a plurality of connector means for holding said drive motor assembly and said wheel assembly together at said heat conducting mating interface and applying a pressure to said heat conducting mating interface selected to produce optimum thermal conduction.

4. The system described in claim 2, wherein said heat conducting mating interface comprises a thermal interface element formed of a thermally conductive material selected to produce optimal heat dissipation and to prevent heat accumulation.

5. The system described in claim 4, wherein said thermal interface element comprises a coating formed from a thermally conductive material selected to promote heat conduction through said heat conducting mating interface.

6. The system described in claim 1, wherein said drive motor assembly is formed of a metal comprising a stainless steel alloy and said wheel assembly is formed of a heat conducting metal comprising an aluminum alloy.

7. An aircraft landing gear drive wheel comprising a wheel assembly configured to support an integrated drive motor and gear assembly completely within a space defined by inboard and outboard boundaries of a landing gear wheel well, wherein said drive motor and gear assembly is supported within said wheel assembly to form a mating interface with and conforming to a shape of said wheel proximate to said inboard boundary to form thermal conduction means for directing heat generated by said drive motor to said mating interface toward said inboard boundary through said wheel assembly to ambient air in the landing gear wheel well environment or to landing gear structures adjacent to said wheel assembly, thereby maintaining said motor and gear assembly and said wheel assembly at an optimum safe temperature selected to prevent damage to said motor and gear assembly and to said wheel assembly.

8. The aircraft landing gear drive wheel described in claim 7, wherein said mating interface is maintained in a conforming condition by the application of a plurality of connector means for holding said drive motor assembly and said wheel assembly together and applying a pressure in the range of about 30 psi to at least about 200 psi to said mating interface selected to produce optimum thermal conduction.

9. The aircraft landing gear drive wheel described in claim 7, wherein said mating interface comprises an interface element formed of a thermally conductive material selected to promote heat dissipation and to prevent heat accumulation.

10. The aircraft landing gear drive wheel described in claim 7, wherein said motor and gear assembly is formed of a metal comprising a stainless steel alloy and said wheel assembly is formed of a metal comprising an aluminum alloy.

11. A method for managing and limiting heat accumulation in an aircraft landing gear drive wheel comprising:
   (a) providing a thermal interface between a drive motor assembly and a wheel assembly positioned to promote heat conduction between an electric drive motor and the wheel support walls of the wheel assembly;
   (b) operating the drive motor assembly to drive the aircraft landing gear drive wheel and generating heat from operation of the electric drive motor within a defined internal space within the wheel support walls;
   (c) directing heat flow from the electric drive motor through the defined internal space through the wheel support walls and through said thermal interface;
   (d) providing a heat flow path from the wheel assembly to structures external to the wheel assembly and to the ambient air outside the wheel assembly, whereby heat can be shed entirely away from the aircraft landing gear drive wheel; and
   (e) maintaining the wheel assembly and the drive motor assembly below a temperature selected to prevent damage to said wheel assembly and said drive motor assembly during operation of said drive motor assembly.

12. The method of claim 11, further comprising forming the drive motor assembly from a metal comprising a stainless steel alloy, forming the wheel assembly from a heat conducting metal comprising an aluminum alloy, and forming the thermal interface between said wheel assembly and said drive motor assembly from a thermally conductive material selected to produce optimal heat dissipation and to prevent heat accumulation, and directing heat generated by said electric drive motor from said drive motor assembly through said thermal interface and said wheel assembly to structures external to the wheel assembly and into the ambient air in contact with the wheel assembly.

* * * * *